(12) United States Patent
Hunt-Schroeder et al.

(10) Patent No.: US 10,971,996 B2
(45) Date of Patent: Apr. 6, 2021

(54) CHARGE PUMP CIRCUIT WITH INTERNAL PRE-CHARGE CONFIGURATION

(71) Applicant: Marvell Asia Pte., Ltd., Singapore (SG)

(72) Inventors: Eric D. Hunt-Schroeder, Essex Junction, VT (US); John A. Fifield, Underhill, VT (US); Dale E. Pontius, Colchester, VT (US)

(73) Assignee: Marvell Asia Pte., Ltd., Singapore (SG)

( * ) Notice: Subject to any disclaimer, the term of this patent is extended or adjusted under 35 U.S.C. 154(b) by 0 days.

(21) Appl. No.: 16/889,508

(22) Filed: Jun. 1, 2020

(65) Prior Publication Data

US 2020/0295653 A1  Sep. 17, 2020

Related U.S. Application Data

(63) Continuation of application No. 15/822,318, filed on Nov. 27, 2017, now Pat. No. 10,673,321.

(51) Int. Cl.
| | |
|---|---|
| *G05F 1/10* | (2006.01) |
| *G05F 3/02* | (2006.01) |
| *H02M 1/36* | (2007.01) |
| *G05F 3/20* | (2006.01) |
| *H02M 3/07* | (2006.01) |

(52) U.S. Cl.
CPC .............. *H02M 1/36* (2013.01); *G05F 3/205* (2013.01); *H02M 3/07* (2013.01)

(58) Field of Classification Search
CPC ............ H02M 1/36; H02M 3/07; G05F 3/205
USPC ........................................................ 327/536
See application file for complete search history.

(56) References Cited

U.S. PATENT DOCUMENTS

| | | | |
|---|---|---|---|
| 5,453,953 A | 9/1995 | Dhong et al. | |
| 6,157,242 A * | 12/2000 | Fukui ................ | H02M 3/073 327/536 |
| 6,304,467 B1 | 10/2001 | Nebrigic | |
| 6,552,600 B2 | 4/2003 | Walimbe et al. | |
| 8,405,375 B2 | 3/2013 | Chen | |
| 9,312,688 B1 | 4/2016 | Farina et al. | |
| 9,385,593 B2 | 7/2016 | Somayajula et al. | |
| 2003/0085752 A1 | 5/2003 | Rader et al. | |

(Continued)

FOREIGN PATENT DOCUMENTS

KR   2001-0061507 A   7/2001

OTHER PUBLICATIONS

Taiwanese Application No. 107121316, JBUR010-TW-NP, Examination Report dated Aug. 6, 2019 and Search Report dated May 27, 2019, pp. 1-8.

*Primary Examiner* — Metasebia T Retebo

(57) ABSTRACT

A charge pump circuit includes a charge pump configured to increase a voltage of an input signal to generate a voltage-boosted input signal, output the voltage-boosted input signal in response to a determination that the voltage-boosted input signal is greater than or equal to a threshold, and connect the charge pump to a supply voltage to pre-charge the charge pump in response to a determination that the voltage-boosted input signal is less than the threshold. The charge pump circuit includes bandgap reference generator configured to receive the voltage-boosted input signal and output, based on the voltage-boosted input signal, a voltage reference signal to a device that operates in accordance with the supply voltage.

20 Claims, 6 Drawing Sheets

(56) References Cited

U.S. PATENT DOCUMENTS

| | | |
|---|---|---|
| 2004/0124907 A1 | 7/2004 | Allum |
| 2005/0140428 A1 | 6/2005 | Tran et al. |
| 2011/0018615 A1 | 1/2011 | Pan |
| 2011/0221514 A1* | 9/2011 | Pan .................. H02M 3/07 327/536 |
| 2014/0253180 A1 | 9/2014 | Wang et al. |
| 2015/0324955 A1* | 11/2015 | Cawley .................. H04N 1/387 345/649 |

* cited by examiner

CHARGE PUMP CIRCUIT WITH INTERNAL PRE-CHARGE CONFIGURATION

CROSS-REFERENCE TO RELATED APPLICATIONS

The present disclosure is a continuation of U.S. patent application Ser. No. 15/822,318, filed on Nov. 27, 2017. The entire disclosure of the application referenced above is incorporated herein by reference.

FIELD

The present disclosure relates to integrated circuits, and more specifically, to reference voltage supplies used in integrated circuits that include charge pumps.

BACKGROUND

Integrated circuit voltage monitoring systems requires a constant temperature and process voltage reference across the entire application specific integrated circuit (ASIC) customer application window, and bandgap systems are useful in providing constant voltages and currents over temperature ranges. However, bandgap systems use a higher input voltage than any voltage on the chip (higher than VCS, VDD, etc.) for proper operation. Bandgap systems either have an adequate power supply or a charge pump that power the bandgap system, and allow the bandgap system to provide constant voltages and currents over temperature ranges.

For example, a charge pump commonly outputs approximately twice the customer supply voltage (2×VCS, 2×VDD, etc.), and can start and run at ultra low voltages (500 mV) and in extreme temperatures (−55 C, 125 C). Generally, charge pumps are operated by an oscillator to provide the boosted power supply voltage. For example, the charge pump and its phase generator circuits may require that the boosted supply output node be precharged to a voltage level before startup. However, at low voltage, cold temperatures, and various process corners, the charge pump may fail to start or may fail from the large current demands that occur during the start up sequence.

SUMMARY

In view of such issues, exemplary integrated circuit (IC) devices herein include (among other components) an oscillator generating a clock signal, and a phase generator electrically connected to the oscillator. The phase generator squares the wave of the clock signal output from the oscillator and outputs a square phase clock signal. Such devices also include a charge pump that is electrically connected to the phase generator. The charge pump increases the voltage of the square phase clock signal output from the phase generator and, when operating properly, outputs a voltage-boosted clock signal (e.g., the charge pump can be a voltage multiplying circuit). Note that a precharge operation is performed on the charge pump before increasing the voltage of the square phase clock signal by connecting a boosted output node of the charge pump to an operating voltage source. Also, a bandgap reference generator is electrically connected to the charge pump. The bandgap reference generator outputs a stable voltage reference using the voltage-boosted clock signal output from the charge pump. The bandgap reference generator is connected to a circuit that operates at an operating (first) voltage, and the voltage threshold is lower than the operating voltage.

The IC devices herein additionally include a multiplexor that is electrically connected to the bandgap reference generator and the charge pump. The multiplexor has a first input that receives voltage levels of the voltage-boosted clock signal being output by the charge pump to the bandgap reference generator. The multiplexor has a first output that outputs, to the charge pump, either: a retry signal (if the voltage levels of the voltage-boosted clock signal being output by the charge pump are below a voltage threshold) or a pump signal (if the voltage levels of the voltage-boosted clock signal being output by the charge pump are not below the voltage threshold). The pump signal causes the charge pump to output the voltage-boosted clock signal to the bandgap reference generator. The retry signal causes the charge pump to not output the voltage-boosted clock signal to the bandgap reference generator, and instead to repeat the precharge operation by reconnecting the boosted output node of the charge pump to the first voltage source.

More specifically, the multiplexor includes resistors matched to the voltage threshold, and the resistors cause the multiplexor to output either the retry signal or the pump by the charge pump are not below the voltage threshold). For example, the multiplexor can include resistors matched to the voltage threshold, where the resistors cause the multiplexor to output either the retry signal or the pump signal. Additionally, the multiplexor includes delay elements connected to the boosted output node of the charge pump that delay disconnection of the boosted output node from the operating voltage source. Additionally, the multiplexor can include delay elements connected to the boosted output node of the charge pump that delay disconnection of the boosted output node from the operating voltage source. Also, the bandgap reference generator may include or supply different loads, and the integrated circuit devices herein can include different length delay elements separately connecting each of the different loads to the charge pump, such that each of the different loads receive the voltage-boosted clock signal at different times from the charge pump.

Additionally, the multiplexor can reduce the rate of the clock signals being output by the oscillator, from an initial clock rate to a slower rate, by outputting the retry signal. The rate of the clock signals returns to the initial clock rate when the multiplexor outputs the pump signal.

Various methods herein generate a clock signal using an oscillator, and square the wave of the clock signal output from the oscillator to output a square phase clock signal (using a phase generator electrically connected to the oscillator). Such methods perform a precharge operation on the charge pump (before increasing the voltage of the square phase clock signal) by connecting a boosted output node of the charge pump to an operating voltage source. After the precharge operation has completed, these methods increase the voltage of the square phase clock signal output from the phase generator to output a voltage-boosted clock signal (using a charge pump electrically connected to the phase generator), and output a stable voltage reference using the voltage-boosted clock signal output from the charge pump (using a bandgap reference generator electrically connected to the charge pump). The bandgap reference generator is connected to a circuit that operates at an operating (first) voltage, and wherein the voltage threshold is lower than the operating voltage.

Also, such methods receive voltage levels of the voltage-boosted clock signal being output by the charge pump to the bandgap reference generator (using a multiplexor electrically connected to the bandgap reference generator and the charge pump). Thus, such methods continuously monitor the voltage levels being output by the charge pump, using the multiplexor, to determine when to output the retry signal or the pump signal. With this, these methods output, from the multiplexor to the charge pump, either: a retry signal (if the voltage levels of the voltage-boosted clock signal being output by the charge pump are below a voltage threshold) or a pump signal (if the voltage levels of the voltage-boosted clock signal being output) by the charge pump are not below the voltage threshold). For example, the multiplexor can include resistors matched to the voltage threshold, where the resistors cause the multiplexor to output either the retry signal or the pump signal. Additionally, the multiplexor includes delay elements connected to the boosted output node of the charge pump that delay disconnection of the boosted output node from the operating voltage source.

Such methods output the voltage-boosted clock signal from the charge pump to the bandgap reference generator, in response to the multiplexor outputting the pump signal. More specifically, the bandgap reference generator may include or be connected to different loads, and the integrated circuit device includes different length delay elements separately connecting each of the different loads to the charge pump, such that each of the different loads receive the voltage-boosted clock signal at different times from the charge pump.

Further, these methods avoid outputting the voltage-boosted clock signal from the charge pump to the bandgap reference generator, in response to the multiplexor outputting the retry signal. Also, these methods repeat the precharge operation on the charge pump by reconnecting a boosted output node of the charge pump to the first voltage source, in response to the multiplexor outputting the retry signal. With these methods, the multiplexor can reduce the rate of the clock signals being output by the oscillator, from an initial clock rate to a slower rate, by outputting the retry signal. The rate of the clock signals returns to the initial clock rate when the multiplexor outputs the pump signal.

BRIEF DESCRIPTION OF DRAWINGS

The embodiments herein will be better understood from the following detailed description with reference to the drawings, which are not necessarily drawn to scale and in which.

DESCRIPTION

As mentioned above, at low voltage, cold temperatures, and various process corners, the charge pump may fail to start or may fail from the large current demands that are present during the start up sequence. The systems and methods herein address these issues by adding a retry circuit to the charge pump design, which starts the pump successfully at lower voltages, different temperatures and process corners.

More specifically, the charge pump and control circuitry herein is configured to precharge a boosted output node to a power supply voltage when the boosted supply voltage is lower than the power supply voltage, and to enable the charge pump to generate a boosted voltage when the boosted output node is essentially equal to or greater than the power supply voltage.

The charge pump and control circuitry includes a voltage multiplying circuit producing a boosted voltage on an output node in response to a clock signal. Also, a comparing circuit compares the output node voltage to a power supply and logic to enable a field effect transistor (FET) to charge the output node to the power supply, when the comparing circuit determines the output node voltage is less than the power supply. Otherwise, the comparing circuit enables the voltage multiplying circuit to generate a boosted voltage, when the output node voltage is essentially equal to or greater than the power supply.

In other structures herein, the charge pump and control circuitry herein include a voltage multiplying circuit producing a boosted voltage on an output node in response to an adjustable clock signal. Here, the comparing circuit compares the output node voltage to a power supply and logic to enable the FET to charge the output node to the power supply, when the comparing circuit determines the output node voltage is less than the power supply. Also, the comparing circuit enables the voltage multiplying circuit to generate a boosted voltage at a IX clocking rate, when the output node voltage is essentially equal to or greater than the power supply. Subsequently, the FET is re-enabled by the comparing circuit to charge the output node, if the output node voltage falls below the power supply; and the comparing circuit re-enables the voltage multiplying circuit to generate a boosted voltage when the output node voltage is essentially equal to or greater than the power supply.

Figure 1:
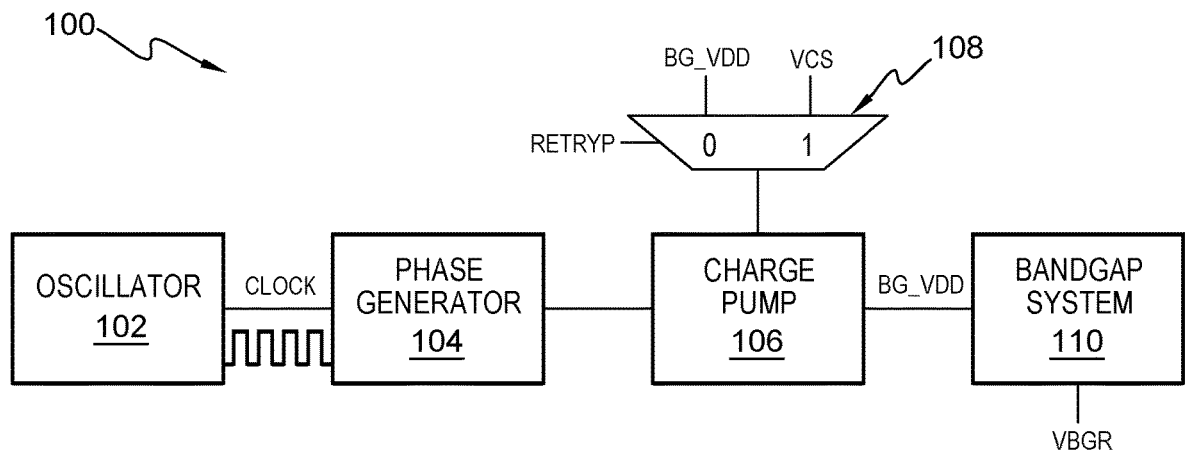
FIGS. 1-4 are schematic diagram illustrating integrated circuit devices according to embodiments herein.

As shown in FIG. 1, exemplary integrated circuit (IC) devices 100 herein include (among other components) an oscillator 102 generating a clock signal (CLOCK), and a phase generator 104 electrically connected to the oscillator 102. The phase generator 104 squares the wave of the clock signal output from the oscillator 102 and outputs a square phase clock signal. Such devices also include a charge pump 106 that is electrically connected to the phase generator 104 (e.g., the charge pump 106 can be a voltage multiplying circuit). The charge pump 106 increases the voltage of the square phase clock signal output from the phase generator 104 and outputs a voltage-boosted clock signal (BG_VDD).

Also, a bandgap reference generator 110 is electrically connected to the charge pump 106. The bandgap reference generator 110 outputs a stable voltage reference signal (e.g., voltage bandgap reference (VBGR)) using the voltage-boosted clock signal output from the charge pump 106. The bandgap reference generator 110 is connected to a circuit (load) that operates at an operating (first) voltage (e.g., VCS), and the voltage threshold is lower than the operating voltage (e.g., between VSS and VCS; where BG_VDD is a higher voltage relative to VCS, and VCS is a higher voltage relative to VSS (where VSS can be 0V)).

The IC devices herein additionally include a comparator or multiplexor 108 that is electrically connected to the bandgap reference generator 110 and the charge pump 106. The multiplexor 108 has a first input that receives voltage levels of the voltage-boosted clock signal BG_VDD being output by the charge pump 106 to the bandgap reference generator 110.

The multiplexor 108 has a first output that outputs, to the charge pump 106, either: a repeat precharge signal (or retry precharge signal RETRYP), if the voltage levels of the voltage-boosted clock signal BG_VDD being output by the charge pump 106 are below a voltage threshold); or a pump signal, if the voltage levels of the voltage-boosted clock signal BG_VDD being output by the charge pump 106 are not below the voltage threshold. The multiplexor 108 continuously monitors the voltage levels being output by the charge pump 106 to determine when to output the retry signal RETRYP or the pump signal.

The pump signal causes the charge pump 106 to output the voltage-boosted clock signal BG_VDD to the bandgap reference generator 110. The retry signal RETRYP causes the charge pump 106 to not output the voltage-boosted clock signal BG_VDD to the bandgap reference generator 110, and instead to precharge the charge pump 106 by connecting a boosted output node of the charge pump 106 to the first voltage source.

Figure 2:
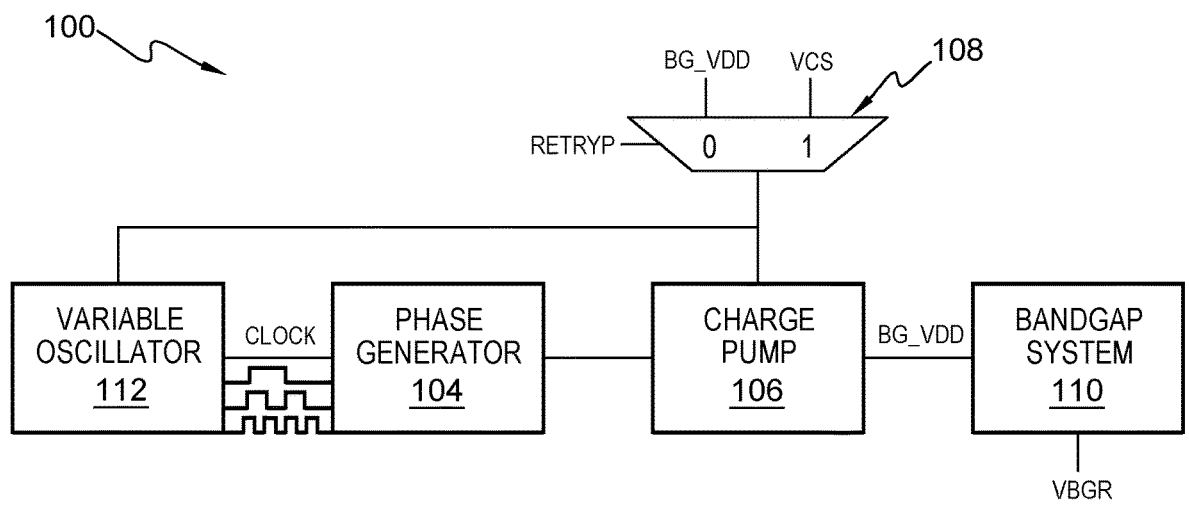

Additionally, as shown in FIG. 2, the oscillator can be a variable oscillator 112. In such devices, the multiplexor 108 reduces the rate of the clock signals being output by the oscillator 112, from an initial clock rate to a slower rate, by outputting the retry signal or pump signal to the oscillator 112. The rate of the clock signals returns to the initial clock rate after some delay when the multiplexor 108 outputs the pump signal. Slowing the clock signal during precharging allows more time for the various components of the charge pump to be pulled up to the proper voltage, and increases the probability that the charge pump will start successfully when the pump signal is output by the multiplexor.

Figure 3:
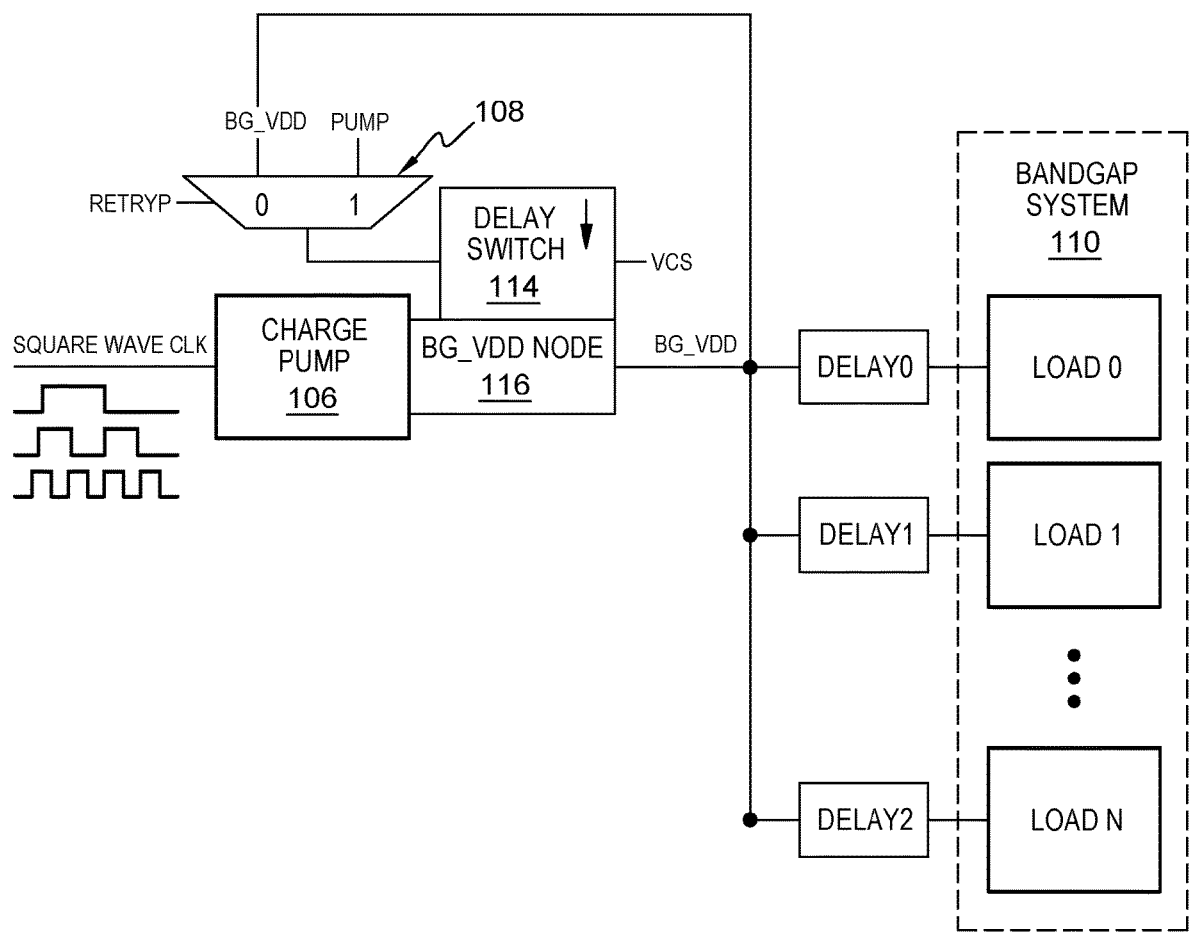

FIG. 3 illustrates in greater detail that an initial precharge operation (in response to a startup signal, etc.) is performed on the charge pump 106 before increasing the voltage of the square phase clock signal. More specifically, the precharge operation is performed by connecting a boosted output node 116 of the charge pump 106 to an operating voltage source VCS using a switch 114 (which can be a combination of various transistors, amplifiers, inverters, etc.). Note that the switch 114 can be separate from the multiplexor 108, or can be part of the multiplexor 108; and to simplify discussion herein, the switch 114 is considered part of the multiplexor 108.

FIG. 3 also shows that the voltage-boosted clock signal BG_VDD output from the boosted output node 116 of the charge pump 106 is supplied back to the multiplexor 108, to allow the multiplexor 108 to select either the pump signal (VCS, PUMP, etc.) or the retry precharge signal (RETRYP). The pump signal sets the switch 114 to allow the charge pump to output the voltage-boosted clock signal to the bandgap reference generator 110. The retry signal sets the switch 114 to prevent the charge pump 106 from outputting the voltage-boosted clock signal to the bandgap reference generator 110, and instead the retry signal sets the switch 114 to repeat the precharge operation by reconnecting the boosted output node 116 of the charge pump 106 to the first voltage source VCS.

Note that FIG. 3 illustrates that the switch 114 is a delay switch; however, the arrow in item 114 indicates that the delay is unidirectional (only operates in one direction). More specifically, when performing a precharging operation, the switch 114 connects the boosted output node 116 of the charge pump 106 to the operating voltage source VCS without delay (to make precharging as fast as possible). However, the switch 114 delays the disconnection of the boosted output node 116 from the operating voltage source VCS when the precharge signal is not present (to keep the precharge state on the boosted output node 116 longer, and thereby increase the chance of successful startup of the charge pump 106).

FIG. 3 also illustrates that the bandgap reference generator 110 may include, be connected to, or supply, different loads (Load 0, Load 1, Load N); and the integrated circuit devices herein can include different time length delay elements (Delay 0, Delay 1, Delay 2, etc.) separately connecting each of the different loads (Load 0, Load 1, Load N) to the charge pump 106. Therefore, the delay elements (Delay 0, Delay 1, Delay 2, etc.) cause each of the different loads (Load 0, Load 1, Load N) to receive the voltage-boosted clock signal BG_VDD at different times from the charge pump 106. This avoids connecting all the loads to the charge pump 106 at the same time, and instead staggers the connection of the loads to the charge pump 106, which decreases the magnitude of the voltage drain on the charge pump 106, and decreases the chance that the charge pump 106 will stall or fail.

Figure 4:
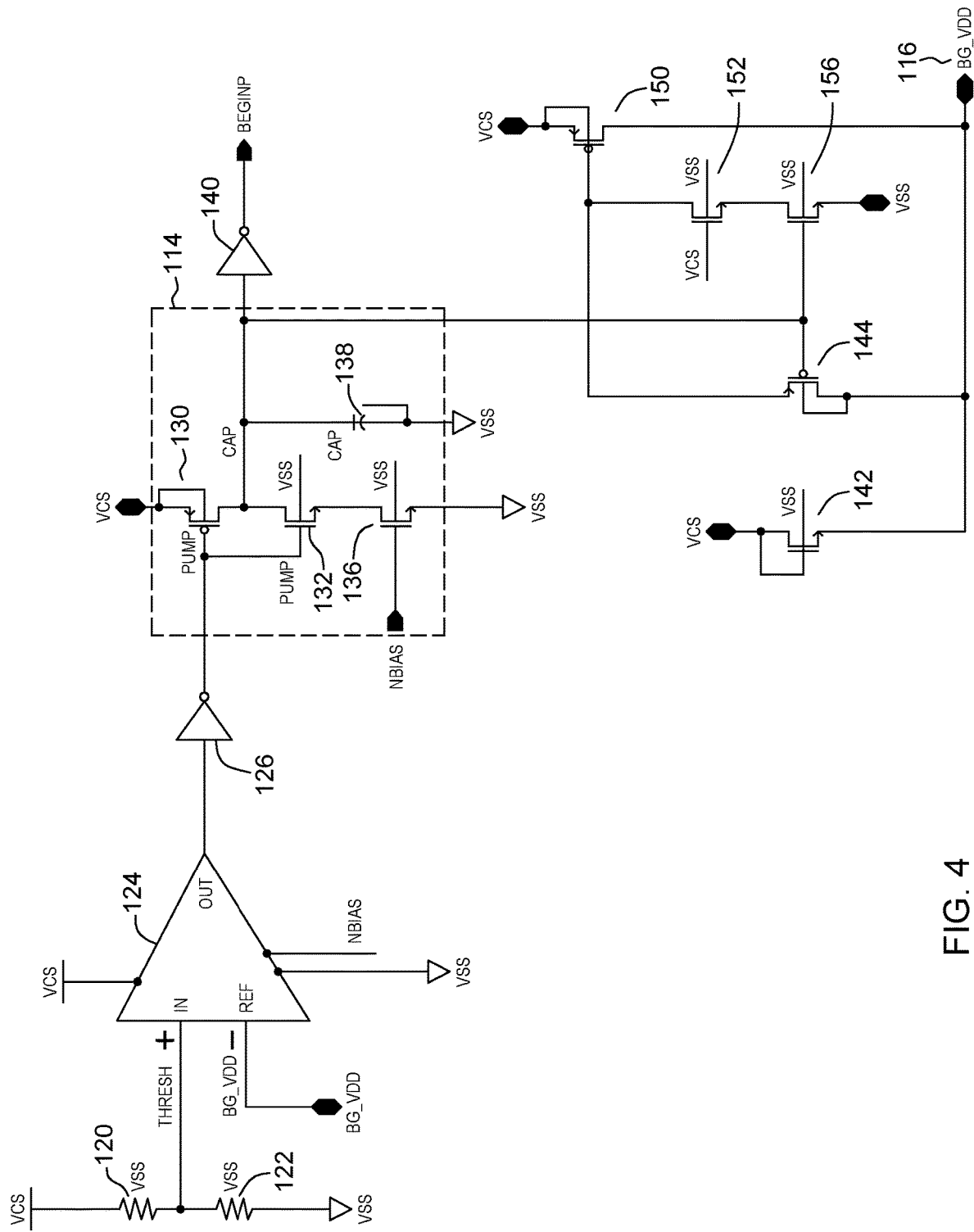

FIG. 4 illustrates one specific implementation of the foregoing comparator/multiplexor 108; however, those ordinarily skilled in the art would understand that FIG. 4 is merely an example, and that other multiplexors with different designs could be used with the structures and methods described herein, and the claims below are intended to include all such alternative designs. As shown in FIG. 4, the multiplexor 108 includes resistors 120, 122 that are sized to define the voltage threshold for precharge retry. The resistor 120 is connected to the operating voltage VCS, while the resistor 122 is connected to the low voltage (VSS). As noted above, BG_VDD is a higher (boosted) voltage relative to VCS, and VCS is a higher voltage relative to VSS (where VSS can be 0V). The node between the resistors 120, 122 represents the voltage threshold (THRESH) which is used by the multiplexor 108 to determine whether to output the retry signal RETRYP or the PUMP signal as determined by the operational amplifier 124.

Therefore, the threshold input to operational amplifier 124 is between VCS and VSS as determined by the resistors 120, 122. The boosted voltage signal BG_VDD is provided as the reference signal to the operational amplifier 124, the low voltage VSS is the negative voltage supply to the operational amplifier 124, and the operating voltage VCS is the positive voltage supply to the operational amplifier 124. If the boosted voltage BG_VDD being output by the charge pump 106 is below the threshold THRESH signal, this will cause the operational amplifier to output the higher voltage (VCS), which is the retry signal (RETRYP), and conceptually is a high or "one" signal. In contrast, if the boosted voltage BG_VDD being output by the charge pump 106 is not below the threshold THRESH signal, this will cause the operational amplifier to output the lower voltage (VSS), which is the pump signal (PUMP), and conceptually is a low or "zero" signal.

The signal output from the operational amplifier 124 is inverted by inverter 126 and is supplied to transistors 130 (p-type field effect transistor (PFET)) and 132 (n-type field effect transistor (NFET)). The inverted retry precharge signal is a low signal and turns on transistor 130, which connects capacitor 138 to VCS, and charges the capacitor 138. The inverted retry precharge (low) signal also turns transistor 132 off, which prevents the capacitor 138 from discharging. The charge level of the capacitor 138 is inverted by inverter 140 and output as the BEGINP signal, which is used by the bandgap system 110 as the indicator that it can begin operating (supplying a constant voltage (VBGR) to the ASIC load).

When the capacitor 138 is discharged, there is a low signal supplied to transistors 144 (PFET) and 156 (NFET). This low signal turns transistor 144 on, which connects BG_VDD at the boosted output node 116 to PFET 150. This turns transistor 150 off, which disconnects VCS from the boosted output node 116.

Transistor 130 is turned off by the inverted pump signal, which is a high signal, but transistor 132 is turned on by such a high signal. This connects the capacitor 138 to transistor 136 (NFET), which is turned on or off by the NBIAS signal. The NBIAS signal is between VCS and VSS (potentially approximately half-way between such voltages). Therefore, the NBIAS supplied to transistor 136 limits the amount that the capacitor 138 can be discharged when the pump signal and transistor 132 are on. The NBIAS voltage is specifically tuned to limit the voltage pull-down of the capacitor 138 to delay the discharging of capacitor 138 after the pump signal is output by the operational amplifier 124. In other words, transistor 136 is in the linear region and acts as a resistor (which forms a resistor-capacitor (RC) circuit with the capacitor 138). This RC circuit (136, 138) provides unidirectional delay of capacitor 138 discharging, while no delay is present for capacitor 138 charging when the low signal turns transistor 130 on, which charges the capacitor 138.

Therefore, transistors 130, 132, 136, and capacitor 138 form the unidirectional switch 114, that is discussed above, and that connects the boosted output node 116 of the charge pump 106 to the operating voltage source VCS without delay when performing a precharging operation (to make precharging as fast as possible); however, the RC circuit of the switch 114 delays the disconnection of the boosted output node 116 from the operating voltage source VCS when the pump signal is output by the operational amplifier 124 (to keep the precharge state on the boosted output node 116 longer, and thereby increase the chance of successful startup of the charge pump 106).

In other words, NBIAS is a mid-point voltage (between VSS and VCS), which is used for a unidirectional delay. The goal of this slow pull down (NFET 136, 132 turning on) is to hold the charge pump 106 in precharge when the system is first started. The bandgap system 110 uses BG_VDD and requires a stable voltage reference right at start up. The delay is only on the pull down to provide a stable voltage, VCS, right at start up. However, in the event the charge pump fails, this forces the system into precharge as quickly as possible. This logic connects BG_VDD to VCS quickly for precharging. Further, this logic disconnects BG_VDD from VCS slowly at start up.

When the capacitor 138 is fully charged, this provides a high signal to turn off transistor 144, and turns on transistor 156 (transistor 152 is turned on by VCS); and this allows transistors 156, 152 to act as circuit protection devices from the high voltage, BG_VDD. More specifically, 156 and 152 are stacked transistors that provide high voltage protection within reliability limits of the technology. Further, turning transistor 156 on, turns transistor 150 on, thereby connecting VCS to the boosted output node 116, precharging BG_VDD to VCS.

Transistor 142 acts as a protection circuit preventing BG_VDD from reaching ground. More specifically, transistor 142 is a diode configured transistor that precharges BG_VDD to VCS-VTHN (within approximately a threshold voltage of VCS), rather than letting BG_VDD go to VSS. PFET transistor 144 is a thick oxide device (capable of handling higher voltages) and protects the other thinner oxide transistors from the higher voltage BG_VDD (which again, can be 2×VCS).

Figure 5:
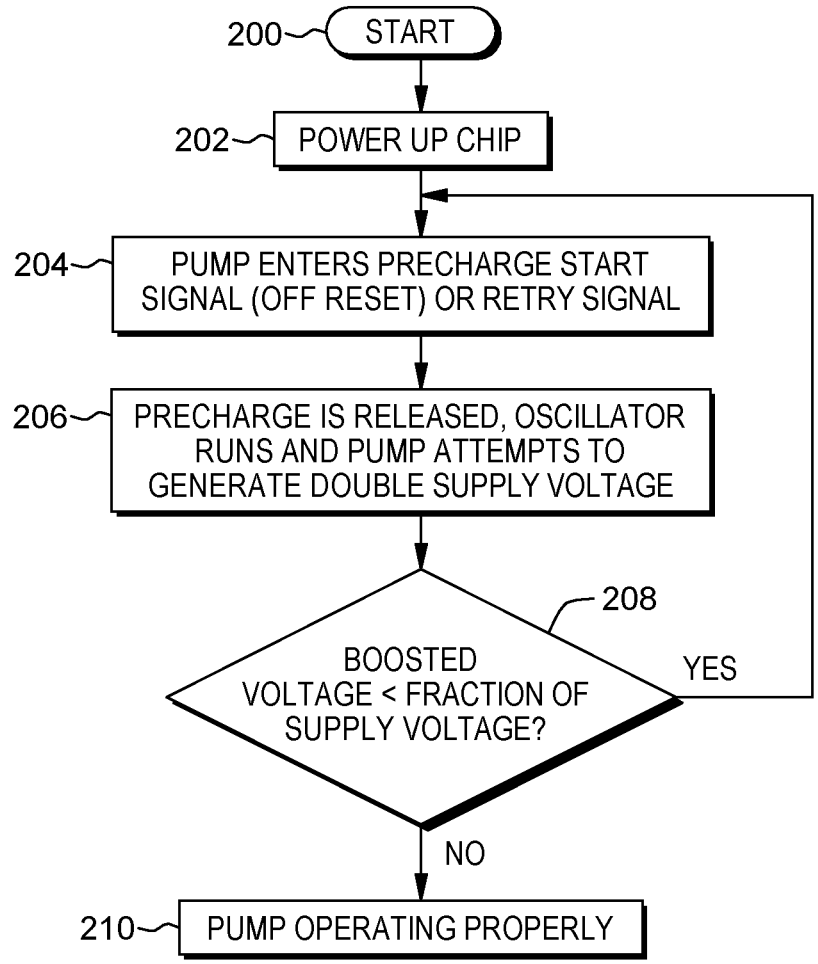
FIGS. 5-7 are flow diagrams illustrating embodiments herein.

FIG. 5 is a flowchart illustrating some operations herein. More specifically, as shown in FIG. 5, item 200 is the start of processing, and in item 202, the chip is powered up. In item 204, the charge pump enters the precharge mode, upon detection of a start signal (off reset) or the retry signal RETRYP. Item 206 shows that the precharging operation has finished, and that the oscillator runs, and the charge pump attempts to generate the boosted bandgap voltage BG_VDD (for example, double the supply voltage).

Item 208 compares the boosted voltage BG_VDD to a fraction of the supply voltage VCS. If the boosted voltage BG_VDD is not less than the fraction of the supply voltage VCS, processing proceeds to item 210, where the pump operates properly and the boosted voltage BG_VDD is output from the charge pump to the bandgap system. On the other hand, if the boosted voltage BG_VDD is less than the fraction of the supply voltage VCS, processing proceeds back to item 204, where the precharge operation is repeated and the start sequence is retried.

Figure 6:
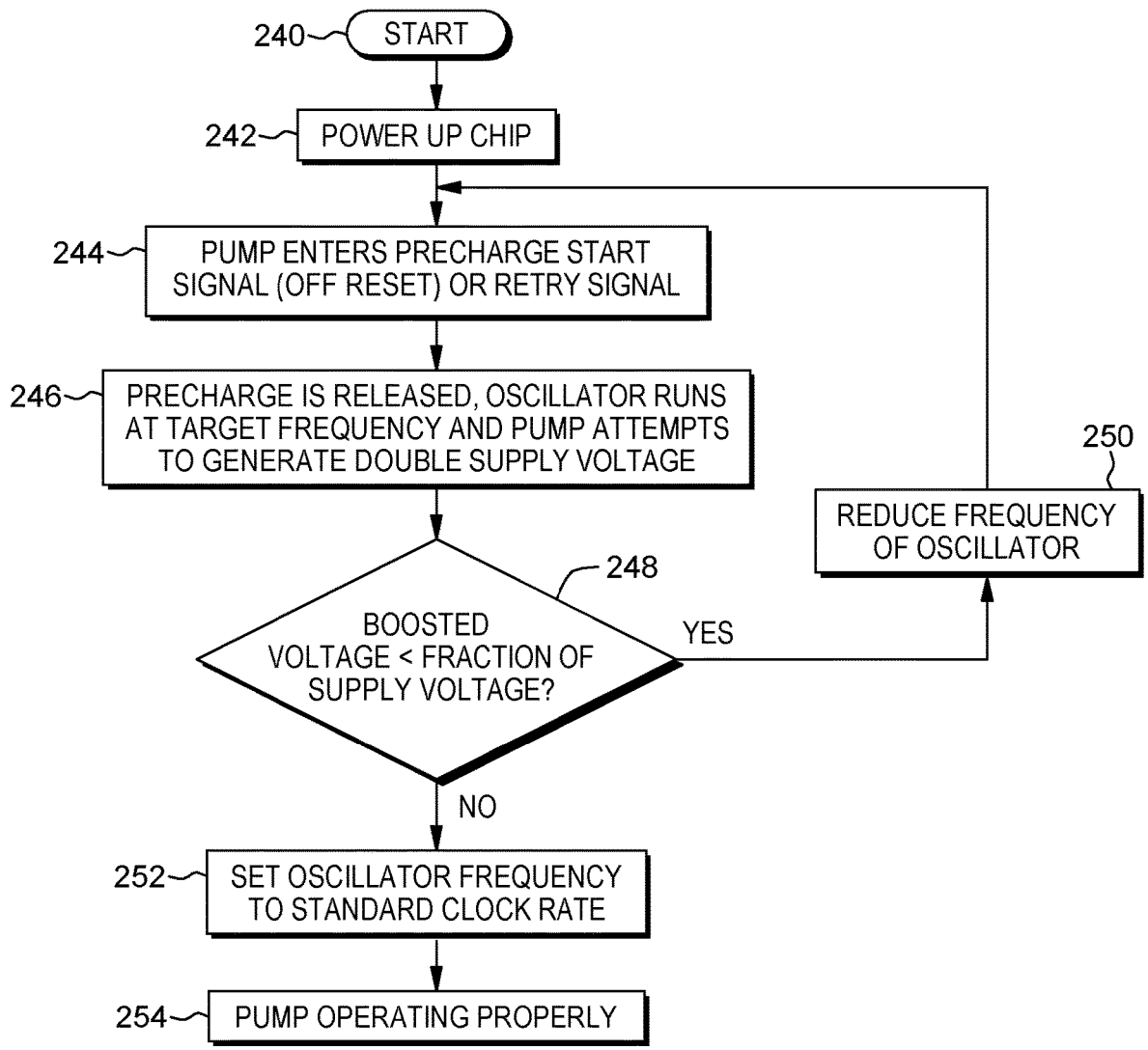

FIG. 6 is a flowchart illustrating other operations herein. More specifically, as shown in FIG. 6, item 240 is the start of processing, and in item 242, the chip is powered up. In item 244, the charge pump enters the precharge mode, upon detection of a start signal (off reset) or the retry signal RETRYP. Item 246 shows that the precharging operation has finished, and that the oscillator runs at a target frequency, and the charge pump attempts to generate the boosted voltage BG_VDD (for example, double the supply voltage).

Item 248 compares the boosted voltage BG_VDD to a fraction of the supply voltage VCS. If the boosted voltage BG_VDD is less than the fraction of the supply voltage VCS, processing proceeds to item 250 where the frequency of the oscillator is reduced, and then back to item 244, where the precharge operation is repeated. Slowing the clock signal in item 250 allows more time for the various components of the charge pump to be pulled up to the proper voltage, and increases the probability that the charge pump will start successfully when the pump signal is output by the multiplexor.

Once the boosted voltage BG_VDD is not less than the fraction of the supply voltage VDD in item 248, processing proceeds to item 252 where the frequency of the oscillator is set to an initial clock rate (which is a higher rate than the reduced rate set in item 250) to return the frequency of the clock signal to the initial rate if it had been reduced. After resetting the clock rate in item 252, processing proceeds to items 252-254, where the pump operates properly and the boosted voltage BG_VDD is output from the charge pump to the bandgap system.

Figure 7:
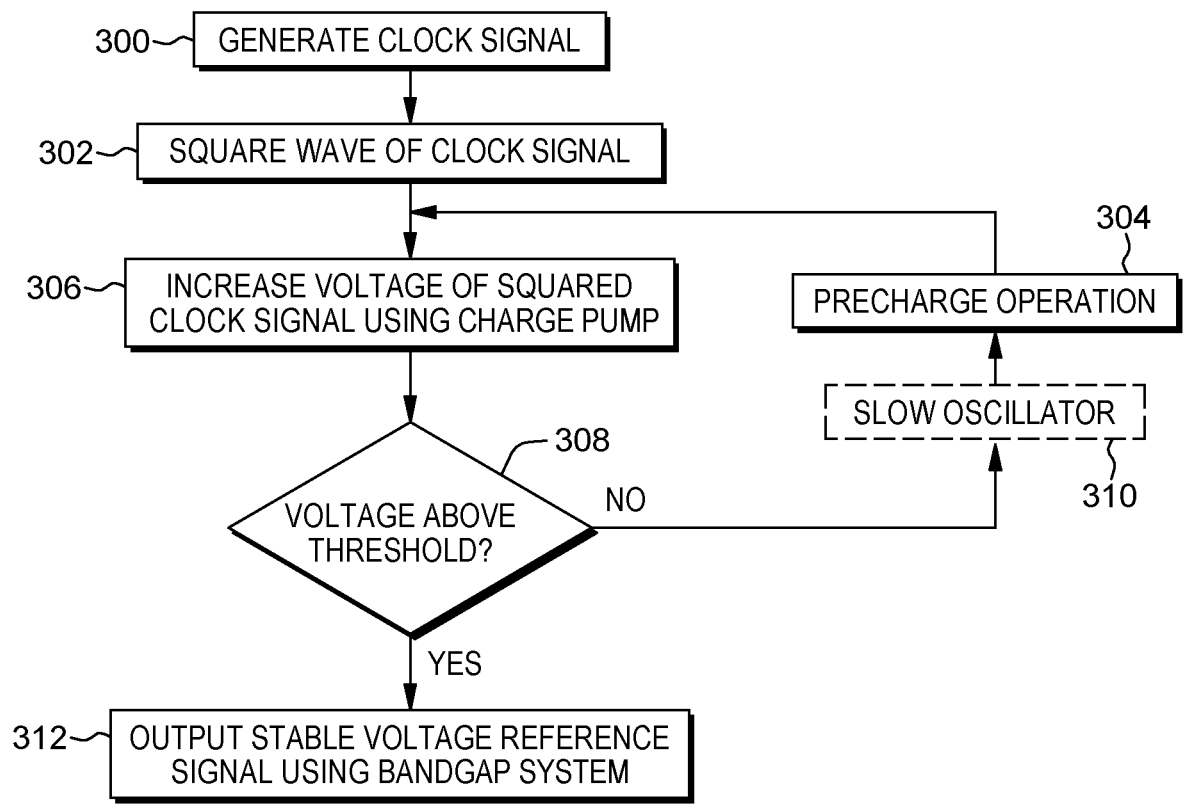

FIG. 7 is a flowchart also illustrating various methods herein that begin by generating a clock signal using an oscillator, in item 300. In item 302, these methods square the wave of the clock signal output from the oscillator to output a square phase clock signal (using a phase generator electrically connected to the oscillator). In item 304, these methods perform a precharge operation that charges the boosted output node of the charge pump by connecting a boosted output node of the charge pump to an operating voltage source. Once the precharge operation in item 304 has been performed, such methods increase the voltage of the square phase clock signal output from the phase generator to output a voltage-boosted clock signal using the charge pump, in item 306.

In item 308 such methods receive voltage levels of the voltage-boosted clock signal being output by the charge pump to the bandgap reference generator (using the multiplexor that is electrically connected to the bandgap reference generator and the charge pump). Thus, in item 308, such methods continuously monitor the voltage levels being output by the charge pump, using the multiplexor, to determine when to output the retry signal or the pump signal.

With this, in item 308, these methods output from the multiplexor to the charge pump, either: a retry signal (if the voltage levels of the voltage-boosted clock signal being output by the charge pump are below a voltage threshold) or a pump signal (if the voltage levels of the voltage-boosted clock signal being output by the charge pump are not below the voltage threshold). For example, the multiplexor can include resistors matched to the voltage threshold, where the resistors set the threshold that causes the multiplexor to output either the retry signal or the pump signal. Thus, these methods repeat the precharge operation by reconnecting the boosted output node of the charge pump to the operating voltage source (in item 304) in response to the multiplexor outputting the retry signal. Also, as shown in item 310, with these methods, the multiplexor can optionally (as indicated by the dashed lines) reduce the rate of the clock signals being output by the oscillator in item 300, from an initial clock rate to a slower rate, by outputting the retry signal. The rate of the clock signals returns to the initial clock rate when the multiplexor outputs the pump signal.

Therefore, such methods output the voltage-boosted clock signal from the charge pump to the bandgap reference generator, in response to the multiplexor outputting the pump signal in item 308. Further, these methods avoid outputting the voltage-boosted clock signal from the charge pump to the bandgap reference generator, in response to the multiplexor outputting the retry signal in item 308.

In item 312, such methods output a stable voltage reference using the voltage-boosted clock signal output from the charge pump (using a bandgap reference generator electrically connected to the charge pump). The bandgap reference generator is connected to a circuit (load) that operates at an operating (first) voltage, and wherein the voltage threshold is lower than the operating voltage. Also, the bandgap reference generator can include, or be connected to, different loads, and the integrated circuit device can include different time length delay elements, separately connecting each of the different loads to the charge pump. Therefore, in item 312, these methods provide different delays, to cause each of the different loads to receive the voltage-boosted clock signal at different times from the charge pump.

There are various types of transistors, which have slight differences in how they are used in a circuit. For example, a bipolar transistor has terminals labeled base, collector, and emitter. A small current at the base terminal (that is, flowing between the base and the emitter) can control, or switch, a much larger current between the collector and emitter terminals. Another example is a field-effect transistor, which has terminals labeled gate, source, and drain. A voltage at the gate can control a current between source and drain. Within such transistors, a semiconductor (channel region) is positioned between the conductive source region and the similarly conductive drain (or conductive source/emitter regions), and when the semiconductor is in a conductive state, the semiconductor allows electrical current to flow between the source and drain, or collector and emitter. The gate is a conductive element that is electrically separated from the semiconductor by a "gate oxide" (which is an insulator); and current/voltage within the gate changes makes the channel region conductive, allowing electrical current to flow between the source and drain. Similarly, current flowing between the base and the emitter makes the semiconductor conductive, allowing current to flow between the collector and emitter.

While only one or a limited number of transistors are illustrated in the drawings, those ordinarily skilled in the art would understand that many different types transistor could be simultaneously formed with the embodiments herein and the drawings are intended to show simultaneous formation of multiple different types of transistors; however, the drawings have been simplified to only show a limited number of transistors for clarity and to allow the reader to more easily recognize the different features illustrated. This is not intended to limit this disclosure because, as would be understood by those ordinarily skilled in the art, this disclosure is applicable to structures that include many of each type of transistor shown in the drawings.

The flowchart and block diagrams in the figures illustrate the architecture, functionality, and operation of possible implementations of devices and methods according to various embodiments. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the foregoing. As used herein, the singular forms "a," "an," and "the" are intended to include the plural forms as well, unless the context clearly indicates otherwise. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements).

Embodiments herein may be used in a variety of electronic applications, including but not limited to advanced sensors, memory/data storage, semiconductors, microprocessors and other applications. A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments herein. The embodiments were chosen and described in order to best explain the principles of such, and the practical application, and to enable others of ordinary skill in the art to understand the various embodiments with various modifications as are suited to the particular use contemplated.

While the foregoing has been described in detail in connection with only a limited number of embodiments, it should be readily understood that the embodiments herein are not limited to such disclosure. Rather, the elements herein can be modified to incorporate any number of variations, alterations, substitutions or equivalent arrangements not heretofore described, but which are commensurate with the spirit and scope herein. Additionally, while various embodiments have been described, it is to be understood that aspects herein may be included by only some of the described embodiments. Accordingly, the claims below are not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later, come to be known, to those of ordinary skill in the art are expressly incorporated herein by reference and intended to be encompassed by this disclosure. It is therefore to be understood that changes may be made in the particular embodiments disclosed which are within the scope of the foregoing as outlined by the appended claims.

What is claimed is:

1. A charge pump circuit, comprising:
   a charge pump configured to
      increase a voltage of an input signal to generate a voltage-boosted input signal,
      output the voltage-boosted input signal in response to a determination that the voltage-boosted input signal is greater than or equal to a threshold, and
      connect the charge pump to a supply voltage that is different from the input signal to pre-charge the charge pump (i) in response to a determination that the voltage-boosted input signal is less than the threshold and (ii) prior to a repeated attempt to increase the voltage of the input signal; and
   a bandgap reference generator configured to
      receive the voltage-boosted input signal, and
      output, based on the voltage-boosted input signal, a voltage reference signal to a device that operates in accordance with the supply voltage.

2. The charge pump circuit of claim 1, wherein the supply voltage is an operating voltage of a circuit that receives the voltage reference signal from the bandgap reference generator.

3. The charge pump circuit of claim 1, wherein the threshold is less than the supply voltage.

4. The charge pump circuit of claim 1, wherein the input signal is a clock signal.

5. The charge pump circuit of claim 1, wherein the charge pump includes a voltage multiplying circuit.

6. The charge pump circuit of claim 1, further comprising a comparator that is configured to (i) receive the voltage-boosted input signal and the supply voltage and (ii) generate an output based on a comparison between the voltage-boosted input signal and the threshold.

7. The charge pump circuit of claim 6, wherein the output of the comparator indicates whether the voltage-boosted input signal is less than the threshold.

8. The charge pump circuit of claim 6, wherein the comparator is configured to define the threshold based on the supply voltage.

9. The charge pump circuit of claim 6, wherein the comparator is a multiplexor.

10. An integrated circuit including the charge pump circuit of claim 6.

11. A method of operating a charge pump circuit, the method comprising:
    using a charge pump,
       increasing a voltage of an input signal to generate a voltage-boosted input signal,
       outputting the voltage-boosted input signal in response to a determination that the voltage-boosted input signal is greater than or equal to a threshold, and
       connecting the charge pump to a supply voltage that is different from the input signal to pre-charge the charge pump in response to a determination that the voltage-boosted input signal is less than the threshold and (ii) prior to a repeated attempt to increase the voltage of the input signal; and
    using a bandgap reference generator,
       receiving the voltage-boosted input signal, and
       outputting, based on the voltage-boosted input signal, a voltage reference signal to a device that operates in accordance with the supply voltage.

12. The method of claim 11, further comprising providing the supply voltage as an operating voltage of a circuit that receives the voltage reference signal from the bandgap reference generator.

13. The method of claim 11, wherein the threshold is less than the supply voltage.

14. The method of claim 11, further comprising providing a clock signal as the input signal.

15. The method of claim 11, further comprising using the charge pump to multiply a voltage of the input signal.

16. The method of claim 11, further comprising generating an output based on a comparison between the voltage-boosted input signal and the threshold.

17. The method of claim 16, wherein the output indicates whether the voltage-boosted input signal is less than the threshold.

18. The method of claim 16, further comprising defining the threshold based on the supply voltage.

19. The method of claim 16, further comprising generating the output using a multiplexor.

20. The method of claim 16, further comprising arranging thecharge pump circuit in an integrated circuit.

* * * * *